United States Patent Office 2,881,096
Patented Apr. 7, 1959

2,881,096

HEAT RESISTANT PRESSURE SENSITIVE ADHESIVE TAPES AND METHOD OF MAKING

Frederick N. Kisbany, Port Huron, Mich., assignor to American Tape Co., Port Huron, Mich., a corporation of Michigan No Drawing. Application September 28, 1956
Serial No. 612,592

12 Claims. (Cl. 117—122)

This invention relates to improved adhesive materials and more particularly to pressure sensitive adhesive materials having improved heat resistance and aging properties.

The invention pertains especially to masking tape and other pressure-sensitive adhesive products that include a vulcanized or partially vulcanized rubber based adhesive coating. Such coatings commonly comprise a vulcanized mixture of rubber, an antioxidant, a resinous tackifying agent, and fillers or reinforcing agents. They may be applied to a backing material such as rubber saturated paper, cloth, or a plastic film. Usually, a so-called tie-coat, or base-coat is applied to the backing material before application of the adhesive coating to insure an adequate bond between the adhesive coating and the backing material. Also, a release coat such as a film of polyvinyl chloride is commonly applied to the backing material on the surface opposite from the adhesive coating to facilitate unwinding when the finished tape is wound upon a roll.

In order to impart a high degree of heat resistance to the adhesive coating, and to impart high cohesive strength at elevated temperatures, it is generally necessary to vulcanize the rubber resin mixture to a point where it can resist heat degradation and loss of cohesive strength under the conditions met in service. The higher the degree of vulcanization the greater is the resistance to heat. In vulcanizing these rubber based compositions, it is usual to include compounding ingredients such as vulcanizates, accelerators and activators in proportions appreciably greater than those theoretically required to attain the desired degree of vulcanization, or cure during the processing or within a reasonable time thereafter. The excess compound ingredients remain in the completed product and generally continue to act on the rubber mixture, extending the cure thereof at a relatively slow rate. A problem of satisfactory aging is therefore created, which problem is a serious one in the presure-sensitive tape industry. Depending on storage conditions of the tape, particularly with respect to temperature, the rubber based adhesive tends to continue its cure to a harder, more resilient and less tacky form until a point is reached where it is commercially unacceptable.

Previous methods of approaching the problem involve the use of cure retardants, reduced proportions of vulcanizing ingredients, or the use of specially selected and prepared vulcanizing agents. Generally, however, in previous practice the use of relatively complicated processing procedures is required to obtain both satisfactory aging characteristics and satisfactory initial properties of the adhesive.

Accordingly, one important object of the present invention is to improve the aging characteristics of pressure-sensitive adhesives of the rubber based types, while at the same time retaining the high heat resistance obtainable through the vulcanizing process. Another object is to provide improved rubber based, pressure-sensitive adhesives for use with adhesive tapes such as masking tape, and having improved aging and heat resistant properties.

These and other objects are accomplished by the instant invention, according to which it has now been found that improved pressure-sensitive rubber based adhesive coatings for masking tape and the like may be made of a rubber-resin compound vulcanized with zinc butyl xanthate as an accelerator, and sulfur or a sulfur compound as a vulcanizer. No organic activator is included in the mixture. The sulfur may be in an elemental form or, preferably, in a compound such as an alkyl phenol sulfide.

Broadly, the improved compositions of the present invention comprise the vulcanization products of, on a dry-weight basis:

| | Parts |
|---|---|
| Rubber (natural, synthetic, or mixed) | 100 |
| Resin or resin mixture | 50 to 120 |
| Inorganic activator and reinforcing agent such as ZnO | 25 to 50 |
| Pigments and fillers such as $CaCO_3$ and $TiO_2$ | 35 to 60 |
| Carbon black | up to 15 |
| Antioxidant | up to 1½ |
| Sulfur, or equivalent quantity of a sulfur-yielding compound | ½ to 2¼ |
| Zinc butyl xanthate | ½ to 3 |

If desired, a small proportion of up to about two to three parts of a plasticizer such as castor oil or mineral oil may also be included. The inclusion of carbon black is optional. It may be added, as indicated, in proportions of up to about 15 parts as a coloring agent or pigment.

The rubber, antioxidant and inorganic ingredients are dry milled or mixed together into a homogeneous mass and dispersed in a solvent such as heptane, together with the resin or resins. The sulfur portion may be incorporated in the dry mixing operation, or during the solvating process, whichever is most convenient for the type used. The zinc butyl xanthate, due to its high activity even at room temperature, is withheld until just prior to use or within 24 hours thereof. The wet adhesive mass is then applied as a surface coating to a backing material such as rubber saturated paper, with or without a tie-coat, as the need may be. The coated backing is then dried, and heated at about 250° to 350° F. for about ½ to 10 minutes to vulcanize, or cure the coating. The resulting adhesive tape has excellent properties under normal conditions, and in addition has greatly improved aging and heat resistant properties as compared to previous adhesive tapes wherein different accelerators are used.

Several illustrative formulations within the scope of the present invention are listed in Table I.

For convenience, the formulations described in this specification are based on 100 parts dry-weight of rubber. The alkyl phenol sulfide listed in the table may be in the form marketed by the Sharples Chemicals, Inc., under the trade name Vultac No. 2. It is a sulfur-yielding, vulcanizing agent, and may be included in proportions of 2 to 9 parts. The antioxidant may be of any of many well-known commercially available antioxidants such as, for example, N-phenyl-N'(p-toluenesulfonyl) p phenylene diamine, sold under the trade name Aranox by Naugatuck Chemical, a division of the U.S. Rubber Company. Polypale ester No. 10 is a glycerol ester of polymerized rosin marketed by the Hercules Powder Company. Pentalyn H is a modified pentaerythritol ester of rosin also sold by the Hercules Powder Company. Zinc butyl xanthate may be obtained from Naugatuck Chemical, a division of U.S. Rubber Company, under the trade name ZBX.

Except for the accelerator, zinc butyl xanthate, and the lack of an organic activating agent, the formulations shown in the table are generally similar to previous formulations, which in place of zinc butyl xanthate include an accelerator such as dibutyl xanthogen disulfide and an organic activator such as activated dithiocarbamate such as is sold by the R. T. Vanderbilt Company under the trade name Butyl Eight.

The rubber may be in any desired form and may be either natural or synthetic as desired. It gives cohesive strength to the coating. Zinc oxide acts as an inorganic activator for the organic accelerator, as well as a reinforcing agent to increase the strength of the coating. It also serves as a coloring agent. Calcium carbonate is a filler and is substantially inert in the composition.

in either a dispersion or solution form, is applied as a surface coating upon a backing material such as a rubber saturated paper. The solvent is evaporated and the coated paper is heated to cure the coating, after which the paper is wound into a master roll to be slit and rewound in a subsequent operation into desired lengths and widths ready for use.

As will be readily appreciated by those skilled in the art, besides variations in the selection of the adhesive coating ingredients, many other variables are present in the process such as, for example, the density of the solution, the nature of the backing material, the nature of the solvent and the degree of heating necessary to evaporate

Table I

| Ingredients | Composition (parts by weight, dry basis) |||||||||||
|---|---|---|---|---|---|---|---|---|---|---|---|
| | 1 | 2 | 3 | 4 | 5 | 6 | 7 | 8 | 9 | 10 | 11 |
| Smoked sheet rubber | 100 | | 75 | 50 | 100 | 100 | 100 | 100 | 100 | 100 | 100 |
| Pale crepe rubber | | 100 | | | | | | | | | |
| GRS rubber | | | 25 | 50 | | | | | | | |
| Zinc oxide | 25 | 40 | 50 | 25 | 50 | 37.5 | 37.5 | 37.5 | 37.5 | 37 | 25 |
| Calcium carbonate | 30 | 50 | | | | | | | 50 | | |
| Titanium oxide | 5 | 10 | | | | | | | | | |
| Castor oil | | | 3 | 2 | | | | | | | |
| Mineral oil | 2 | 2 | | | | | | | | | |
| Antioxidant | 1.5 | 1.5 | 1 | 1 | | 1 | 1 | 1 | 1 | 1.5 | 1.5 |
| Polymerized terpene resin | 50 | | 100 | 25 | 90 | | | | | 60 | 25 |
| Hydrogenated rosin | 50 | 100 | | 75 | | | | | | 60 | 25 |
| Polypale Ester No. 10 | | | | | | 42.5 | 35 | 32.5 | 47.5 | | |
| Pentalyn H | | | | | | 42.5 | 35 | 32.5 | 47.5 | | |
| Alkyl phenol sulfide | 3 | 4 | 8 | 9 | | 3 | 3 | 3 | 3 | 4 | 3 |
| Sulfur | | | | | 1.25 | | | | | | |
| Zinc butyl xanthate | 1 | 3 | 2 | 4 | 2 | 1 | 1 | 1 | 1.5 | 3 | ¾ |
| Heptane, or other solvent | 450 | 500 | 450 | 425 | 400 | 410 | 400 | 390 | 475 | 450 | 350 |

Titanium oxide is used as an inert whitening or coloring pigment. Castor oil and mineral oil are plasticizers. The antioxidant functions to improve the aging characteristics of the rubber and to minimize its oxidation during storage. The resins are tackifying agents which lend adhesiveness to the coating, and are selected for the particular tack properties desired.

Heptane is a solvent to facilitate application of the raw mixture to a backing surface. Any other of many known solvents such as, for example, naphtha may be substituted for heptane, and the proportions of the solvent may be varied as desired to control the thickness of the coating applied to the backing. The solution density and viscosity will be determined in view of the coating thickness desired and also in view of the particular coating process used, certain types of coating apparatus being more readily adaptable for use with relatively thick solutions and others being adapted for use with relatively thin solutions. The nature of the backing material will also affect the solution density desired. In general, however, it may be said that a solution of about 50 to 70 percent solvent by weight has a satisfactory viscosity for use with most coating machines and upon most backings.

It will be recognized that not all of the compound ingredients are soluble in organic solvents such as heptane, and that the mixture resulting from churning the ingredients in such a solvent may more accurately be described as a dispersion of the non-soluble ingredients in a solution of the soluble ones. The distinction is not critical in the present discussion, however, and for convenience the mixture may be referred to as a solution since it resembles and behaves much like similar mixtures that do not include insoluble ingredients.

The rubber and insoluble materials of the formulations (except for zinc butyl xanthate as hereinabove explained) are generally premixed in a mill or mixing machine such as a Banbury mixer, and then dispersed in the solvent together with the liquid and resin ingredients. The resulting solution, after addition of the zinc butyl xanthate it completely, and the time and temperature at which the coating is cured. For a given formulation, however, and a given backing material such as rubber saturated paper, the principal process variations may be found in the drying and curing steps, primarily in the time and temperature used in curing the coating. These parameters in typical continuous commercial processes are not readily susceptible to precise definition, since the cure obtained may be affected by normally uncontrollable factors such as the ambient atmospheric temperature, and thermal gradients in the heating chambers, which gradients may be substantially different in different installations.

In general, however, it may be said that satisfactory results may be obtained if the adhesive coating is first heated over a period of about 1.2 to 1.4 minutes to an intermediate temperature of about 250° F., and then over the next succeeding 1 to 1.2 minutes raised to a final temperature of about 330° F. to 350° F., and immediately cooled.

For ease of comparison the curing times and temperatures given in this specification are described in terms of a batch type process in which the adhesive is cured in an ordinary oven, the oven being brought up to the curing temperature as rapidly as possible after the work is placed therein. In these terms then, satisfactory cures may be accomplished over a range of about ½ minute at about 350° F., to about eight or ten minutes at 250° F. Even lower temperatures and longer times may be used, but are generally not commercially advantageous. The higher the temperature, the shorter is the time required for a predetermined degree of cure, and variations in the degree of cure may be readily obtained by varying either factor while holding the other one constant. Generally, excellent properties may be achieved in all of the formulations listed in Table I when they are cured for about two minutes at about 300° F.

Pressure-sensitive masking tape according to the invention may be made on typical commercial processing apparatus by first mixing a master batch of rubber and dry ingredients. Taking, for example, the formulation listed in Table I as Composition 1, about 35 parts (one quarter of the total rubber) dry-weight basis, of No. 1 smoked sheet rubber is placed in a Banbury mixer together with 25 parts of zinc oxide, 30 parts of calcium carbonate (precipitated whiting), 5 parts of titanium oxide, and 1.5 parts of an antioxidant in solid form, and blended in the mixer thoroughly to intermix the ingredients. This initial blend is called the zinc oxide master batch.

The amount of mixing required to achieve thorough blending of the ingredients tends to break down the rubber excessively, so this master batch, or premix method is used to prevent excessive breakdown of the entire mass of rubber and to give a desired optimum average breakdown.

The balance of the rubber is then added to the mixer and blended with the zinc oxide master batch until a desired optimum average breakdown is reached, usually corresponding to a Mooney viscosity of 45 to 55. The resulting mixture is placed in a churn together with about 450 parts by weight of heptane, 2 parts by weight of mineral oil, 50 parts each of the resin and rosin, 1 part zinc butyl xanthate and 3 parts by weight of the alkyl phenol sulfide. These materials are thoroughly mixed in the churn to produce a smooth, homogeneous dispersion, or solution, which is applied to a backing sheet material by any convenient means such as an industrial coating machine.

The zinc butyl xanthate should not be added to the rubber while it is in the mill, but is withheld, and is added only in the churn. In this way, the tendency of the zinc butyl xanthate to cure the rubber in the mill is avoided, and the mixing process may be carried out without difficulty.

The backing material may be a rubber saturated paper such as is commonly used in the manufacture of masking tape, and may include a so-called base, or tie-coat upon its surface to which the adhesive mixture is to be applied. This base, or tie-coat is generally effective to improve the adherence of the adhesive mixture to the paper backing and may or may not be desired depending upon the end use to which the tape is to be put. A satisfactory base-coat composition may be made according to the following formulation:

Parts by weight, dry basis
Neoprene GNA _____ 100
Calcium carbonate _____ 35
Staybelite resin [1] _____ 65
Magnesium oxide _____ 8
Solvent (such as toluene) _____ 200

[1] Staybelite resin is a hard, brittle, hydrogenated rosin marketed by the Hercules Powder Company.

This base coat composition is applied to the paper backing prior to application of the adhesive coating, and is allowed to dry before the adhesive coating is applied.

After the adhesive material is applied to the backing, it is dried and cured as hereinabove described, and as the material comes out of the oven it is wound into a master roll which is later cut and rewound into smaller rolls.

The rubber saturated paper backing may also include a release coat to facilitate unwinding of the tape when it is wound upon a roll. This release coat is applied to the side of the backing opposite from the adhesive coating and may comprise, for example, shellac, or any of many smooth, film-forming resins such as fused polyvinyl chloride resins.

For the purpose of illustrating the improved properties of masking tapes made according to the present invention, a comparison may be made between the products of two prior art formulations and the formulation shown in Table I as Composition 1, all of which are identical except for the accelerators and organic activators included therein.

Table II

| Ingredient, or process condition | Formulation and processing | | | | |
|---|---|---|---|---|---|
| | Comp. 1 | A | B | | |
| Smoked sheet rubber____parts__ | 100 | 100 | 100 | | |
| Zinc oxide_____do____ | 25 | 25 | 25 | | |
| Calcium carbonate_____do____ | 30 | 30 | 30 | | |
| Alkyl phenol sulfide_____do____ | 3 | 3 | 3 | | |
| Titanium oxide_____do____ | 5 | 5 | 5 | | |
| Mineral oil_____do____ | 2 | 2 | 2 | | |
| Antioxidant_____do____ | 1.5 | 1.5 | 1.5 | | |
| Polymerized terpene resin___do____ | 50 | 50 | 50 | | |
| Hydrogenated rosin_____do____ | 50 | 50 | 50 | | |
| Dibutyl xanthogen disulfide do____ | | 1.68 | 1.87 | | |
| Butyl Eight_____do____ | | 0.67 | 0.67 | | |
| Zinc butyl xanthate_____do____ | 1 | | | | |
| | | | B-1 | B-2 | B-3 |
| Curing temperature, °F_____ | 300 | 300 | 300 | 300 | 300 |
| Curing time, mins_____ | 2 | 1¾ | 1¼ | 1½ | 2¼ |

The formulations A and B are identical with the formulation of Composition 1, except that in place of zinc butyl xanthate, dibutyl xanthogen disulfide is used as an accelerator and Butyl Eight as an organic activator. The proportions of dibutyl xanthogen disulfide and Butyl Eight used in formulations A and B were selected upon the basis of numerous experiments to determine the optimum initial properties and aging characteristics of the adhesive that may be achieved using these ingredients.

The formulations were prepared in identical ways on identical machinery and applied to similar rubber saturated paper backing materials. The resulting tapes were subjected to three separate tests:

The first test is called a drop-shear test, and is run at room temperature. It is designed to indicate the degree of cure, or vulcanization attained. This test consists of placing two one-half inch wide strips of tape face to face so that they overlap each other by one-half inch, resulting in a mutual contact area of one-half inch by one-half inch. The two strips are pressed together by rolling with a weighted roll in a standard manner. They are then tensioned by the application of a force of 2000 grams applied between the free ends of the two strips. The time for the face to face bond to fail (by sliding apart) is denoted the drop-shear. The longer the time, the greater the cure.

The second test is called a hot-plate transfer test, and comprises pressing a standard size strip of tape, adhesive face down, upon a smooth chrome-plated surface maintained at a temperature of 225° F. The strip is then pulled slowly back on itself at a 180° angle. Any adhesive transfer to the chrome surface in this test indicates that transfer to a hot object may be expected in usage.

The third test is called a hot-holding power test, and comprises applying a one-half inch wide strip of tape face down to a stainless steel panel so that it overlaps the panel by one-half inch, resulting in a contact area of one-half inch by one-half inch. After rolling with a weighted roll in a standard manner, the panel is vertically supported in an oven at 220° F. and a load of 100 grams is suspended from the strip. The time required to fail is recorded as the hot-holding power. A minimum time of about 60 minutes is considered necessary to ensure satisfactory performance in many commercial and industrial applications. The type of failure is also recorded, whether the adhesive coating fails cohesively, leaving an adhesive mass on both the panel and the backing, or whether the adhesive coating remains entirely with the backing and releases cleanly from the steel panel. If the adhesive coating fails cohesively in less than sixty minutes, a low degree of cure is indicated. If the adhesive coating remains completely with the backing, an unsatisfactorily high degree of cure is indicated.

In order to measure the aging characteristics of the adhesives, accelerated exposure at 140° F. was given the tape specimens for one, two, and three days, after which hot-holding power tests were run again. Additional hot-holding power tests were also run after normal shelf aging for 30 or 45 days.

The results of these tests for tapes made according to the formulations given in Table II are shown in Table III. Differences between the different samples of Composition 1 probably result from only slight unavoidable differences in curing conditions.

*Table III*

| Comp. | Test | | | | | | |
|---|---|---|---|---|---|---|---|
| | Drop shear, mins. | Hot plate transfer | Hot holding power (minutes) | | | | |
| | | | Initial | 1 day at 140° F. | 2 days at 140° F. | 3 days at 140° F. | Shelf aged |
| A | 2 | Excessive | 26 "C" | Over 60 | 17 "A" | | Over 60. |
| B-1 | 4 | do | 23 "C" | 24 "A" | 23 "A" | 12 "A" | Do. |
| B-2 | 5 | do | 17 "C" | 16 "A" | 9 "A" | 9 "A" | 17 "A."¹ |
| B-3 | 3½ | None | Over 80 | do | 10 "A" | | 25 "A." ¹ |
| 1 | 14½ | do | Over 60 | | Over 78 | Over 74 | Over 63. |
| 1 | 26 | do | Over 85 | Over 60 | Over 60 | Over 60 | Over 62. |
| 1 | 30 | do | Over 60 | do | do | do | Over 61. |
| 1 | 19 | do | do | do | do | do | Over 63. |
| 1 | 11 | do | do | do | do | do | Do. |

¹ Samples marked with asterisk were aged 30 days, all others were aged 45 days.
"C" represents a cohesive type failure, resulting in bad transfer, an indication of undercure.
"A" represents an adhesive type failure, resulting in falling off without residue, an indication of overcure.

It will be seen that a satisfactory condition cannot be achieved using the prior art accelerator and activator, since either the initial properties or the aging characteristics must be sacrificed. The use of zinc butyl xanthate, on the other hand, lets one have his cake and eat it too, since both the initial properties and the aging characteristics may be simultaneously optimized. Moreover, the use of zinc butyl xanthate results in a significant improvement, particularly with respect to heat resistance and aging.

Zinc butyl xanthate is relatively difficult to use for ordinary rubber processing, since it is relatively sensitive to heat and is capable of effecting rapid vulcanization even at relatively low temperatures. Further, this compound is relatively unstable and may be relatively easily decomposed by oxidation. In view of these properties of zinc butyl xanthate, especially its curing speed and heat sensitivity, the present results are surprising. Normally, only an "overcured" product would be expected.

Although the actual reasons for the improvement achieved by the practice of the invention are not definitely known, it is presently believed that during curing the excess zinc butyl xanthate decomposes to form xanthogen disulfides, which are relatively inactive and in the absence of activating agents do not significantly extend the cure during aging. The reactions involved appear to be relatively complicated. Even though an excess of the xanthate is used, as is indicated by the variations in adhesive properties as a function of curing time or temperature, the excess is substantially ineffective to promote additional curing during shelf aging. It is not definitely understood just how the curing and decomposition characteristics of the xanthate are balanced to achieve this advantageous result. Apparently, the decomposition, or inactivation of the xanthate continues subsequent to the termination of the cure, thereby enabling the degree of cure to be determined by the process parameters without losing the desirable xanthate characteristic of excellent shelf life and absence of continuing cure after processing.

What is claimed is:

1. Method of making an adhesive tape comprising the steps of making a mixture consisting essentially of rubber, tackifying resins, inorganic activators and reinforcing agents, selected filler materials, zinc butyl xanthate, and a material selected from the group consisting of sulfur and an alkyl phenol sulfide, in a volatile solvent to form a solution, applying a coating of said solution upon a backing sheet, and heating said coating at about 250° to 350° F. for about 10 to ½ minutes to form a pressure sensitive adhesive of improved stability capable of retaining commercially acceptable properties when stored at room temperatures for at least 45 days.

2. An adhesive tape made according to the method defined in claim 1.

3. Method of making an adhesive tape comprising making a mixture consisting essentially of on a dry weight basis:

| | Parts |
|---|---|
| Rubber | 100 |
| Tackifying resins | 50 to 120 |
| Inorganic activators and reinforcing agents | 25 to 50 |
| Pigments and filler materials | 35 to 60 |
| Carbon black | Up to 15 |
| Antioxidant | Up to 1½ |
| Plasticizer | Up to 3 |
| Zinc butyl xanthate | ½ to 3 | and a substance selected from the group consisting of ½ to 2¼ parts sulfur and 2 to 9 parts of an alkyl phenol sulfide in a volatile solvent to form a dispersion of about 50% to 70% solvent, weight basis, applying a coating of said dispersion upon a backing sheet, and heating said coating at about 250° F. to 350° F. for about 10 to ½ minutes to drive off said solvent and to cure said coating.

4. Method of making an adhesive tape comprising making a mixture consisting essentially of on a dry weight basis:

| | Parts |
|---|---|
| Rubber | 100 |
| Tackifying resins | 50 to 120 |
| Inorganic activators and reinforcing agents | 25 to 50 |
| Pigments and filler materials | 35 to 60 |
| Carbon black | Up to 15 |
| Antioxidant | Up to 1½ |
| Plasticizer | Up to 3 |
| Zinc butyl xanthate | ½ to 3 | and a substance selected from the group consisting of ½ to 2¼ parts sulfur and 2 to 9 parts of an alkyl phenol sulfide, said tackifying resins being selected from the group consisting of polymerized terpene resin, hydrogenated resin, glycerol ester of polymerized resin, modified pentaerythritol ester of resin, and mixtures thereof, in a volatile solvent to form a dispersion of about 50% to 70% solvent, weight basis, applying a coating of said dispersion upon a backing sheet, and heating said coating at about 250° to 350° F. for about 10 to ½ minutes to drive off said solvent and to cure said coating.

5. Method of making an adhesive tape comprising making a mixture consisting essentially of on a dry weight basis:

| | Parts |
|---|---|
| Rubber | 100 |
| Zinc oxide | 25 to 50 |
| Calcium carbonate | Up to 50 |
| Titanium oxide | Up to 10 |
| Castor oil | Up to 3 |
| Mineral oil | Up to 2 |
| Antioxidant | Up to 1.5 |
| Tackifying resins | 50 to 120 |
| Zinc butyl xanthate | ½ to 3 | and a substance selected from the group consisting of ½ to 2¼ parts sulfur and 2 to 9 parts of an alkyl phenol sulfide in a volatile solvent to form a dispersion of about 50% to 70% solvent, weight basis, applying a coating of said dispersion upon a backing sheet, and heating said coating at about 250° F. to 350° F. for about 10 to ½ minutes to drive off said solvent and to cure said coating.

6. Method of making an adhesive tape comprising making a mixture consisting essentially of on a dry weight basis:

| | Parts |
|---|---|
| Rubber | 100 |
| Zinc oxide | 25 |
| Calcium carbonate | 30 |
| Titanium oxide | 5 |
| Mineral oil | 2 |
| Antioxidant | 1.5 |
| Polymerized terpene resin | 50 |
| Hydrogenated rosin | 50 |
| Alkyl phenol sulfide | 3 |
| Zinc butyl xanthate | 1 | in a volatile solvent to form a dispersion of about 50% to 70% solvent, weight basis, applying a coating of said dispersion upon a backing sheet, and heating said coating at about 250° F. to 350° F. for about 10 to ½ minutes to drive off said solvent and to cure said coating.

7. Method of making an adhesive tape comprising making a mixture consisting essentially of on a dry weight basis:

| | Parts |
|---|---|
| Rubber | 100 |
| Zinc oxide | 37.5 |
| Antioxidant | 1 |
| Glycerol ester of polymerized rosin | 42.5 |
| Modified pentaerythritol ester of rosin | 42.5 |
| Alkyl phenol sulfide | 3 |
| Zinc butyl xanthate | 1 | in a volatile solvent to form a dispersion of about 50% to 70% solvent, weight basis, applying a coating of said dispersion upon a backing sheet, and heating said coating at about 250° F. to 350° F. for about 10 to ½ minutes to drive off said solvent and to cure said coating.

8. An adhesive tape made according to the method defined in claim 7.

9. Method of making an adhesive tape comprising making a mixture consisting essentially of on a dry weight basis:

| | Parts |
|---|---|
| Rubber | 100 |
| Zinc oxide | 37.5 |
| Antioxidant | 1 |
| Glycerol ester of polymerized rosin | 35 |
| Modified pentaerythritol ester of rosin | 35 |
| Alkyl phenol sulfide | 3 |
| Zinc butyl xanthate | 1 | in a volatile solvent to form a dispersion of about 50% to 70% solvent, weight basis, applying a coating of said dispersion upon a backing sheet, and heating said coating at about 250° F. to 350° F. for about 10 to ½ minutes to drive off said solvent and to cure said coating.

10. Method of making an adhesive tape comprising making a mixture consisting essentially of on a dry weight basis:

| | Parts |
|---|---|
| Rubber | 100 |
| Zinc oxide | 37.5 |
| Antioxidant | 1 |
| Glycerol ester of polymerized rosin | 32.5 |
| Modified pentaerythritol ester of rosin | 32.5 |
| Alkyl phenol sulfide | 3 |
| Zinc butyl xanthate | 1 | in a volatile solvent to form a dispersion of about 50% to 70% solvent, weight basis, applying a coating of said dispersion upon a backing sheet, and heating said coating at about 250° F. to 350° F. for about 10 to ½ minutes to drive off said solvent and to cure said coating.

11. Method of making an adhesive tape comprising making a mixture consisting essentially of on a dry weight basis:

| | Parts |
|---|---|
| Rubber | 100 |
| Zinc oxide | 37.5 |
| Calcium carbonate | 50 |
| Antioxidant | 1 |
| Glycerol ester of polymerized rosin | 47.5 |
| Modified pentaerythritol ester of rosin | 47.5 |
| Alkyl phenol sulfide | 3 |
| Zinc butyl xanthate | 1 | in a volatile solvent to form a dispersion of about 50% to 70% solvent, weight basis, applying a coating of said dispersion upon a backing sheet, and heating said coating at about 250° F. to 350° F. for about 10 to ½ minutes to drive off said solvent and to cure said coating.

12. Method of making an adhesive tape comprising making a mixture consisting essentially of on a dry weight basis:

| | Parts |
|---|---|
| Rubber | 100 |
| Tackifying resins | 50 to 120 |
| Filler materials | 25 to 100 |
| Antioxidant | Up to 1½ |
| Plasticizer | Up to 3 |
| Zinc butyl xanthate | ½ to 3 | and a substance selected from the group consisting of ½ to 2¼ parts sulfur and 2 to 9 parts of an alkyl phenol sulfide in a volatile solvent to form a dispersion of about 50% to 70% solvent, weight basis, applying a coating to said dispersion upon a backing sheet, heating said coating over a period of about 1.2 to 1.4 minutes up to a temperature of about 250° F., and thereafter over the next succeeding 1 to 1.2 minutes, heating said coating to a temperature of about 330° F. to 350° F., and thereafter cooling said coating.

References Cited in the file of this patent

UNITED STATES PATENTS

| 1,440,963 | Cadwell | Jan. 2, 1923 |
| 2,386,696 | Lloyd | Oct. 9, 1945 |
| 2,410,078 | Kellgren | Oct. 29, 1946 |
| 2,410,079 | Kellgren | Oct. 29, 1946 |
| 2,477,196 | Mohr | July 26, 1949 |
| 2,615,059 | Bemmels | Oct. 21, 1952 |

OTHER REFERENCES

Twiss et al.: "Transactions," Journal of the Society of Chemical Industry, vol. XLII, No. 52, pp. 499T–505T, December 28, 1923.